US011619209B2

(12) United States Patent
Kimura et al.

(10) Patent No.: US 11,619,209 B2
(45) Date of Patent: Apr. 4, 2023

(54) INSPECTION METHOD FOR WIND TURBINE BLADE OF WIND POWER GENERATING APPARATUS

(71) Applicant: MITSUBISHI HEAVY INDUSTRIES, LTD., Tokyo (JP)

(72) Inventors: Yasutaka Kimura, Tokyo (JP); Tairiku Adachi, Tokyo (JP); Kazuumi Kondo, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 125 days.

(21) Appl. No.: 17/387,231

(22) Filed: Jul. 28, 2021

(65) Prior Publication Data
US 2022/0349386 A1 Nov. 3, 2022

(30) Foreign Application Priority Data

Apr. 28, 2021 (JP) .............................. JP2021-076067

(51) Int. Cl.
*F03D 17/00* (2016.01)
*G01N 29/04* (2006.01)

(52) U.S. Cl.
CPC ........... *F03D 17/00* (2016.05); *G01N 29/043* (2013.01); *F05B 2260/80* (2013.01);
(Continued)

(58) Field of Classification Search
CPC .... F03D 17/00; G01N 29/043; G01N 29/326; G01N 2291/103; G01N 2291/0289;
(Continued)

(56) References Cited

U.S. PATENT DOCUMENTS 7,086,834 B2 * 8/2006 LeMieux .................. F03D 7/02
416/37
8,502,405 B2 * 8/2013 Hirai ....................... F03D 80/60
290/55
(Continued)

FOREIGN PATENT DOCUMENTS

EP 1 930 722 A2 6/2008
EP 1 930 722 A3 4/2013
(Continued)

OTHER PUBLICATIONS

Japan Patent Office, "Office Action for the Japanese Patent Application 2021-076067," dated Mar. 8, 2022.

*Primary Examiner* — Jacques M Saint Surin
(74) *Attorney, Agent, or Firm* — Manabu Kanesaka; Benjamin Hauptman; Kenneth Berner (57) ABSTRACT

An inspection method according to the present disclosure includes a step of mounting an ultrasonic probe, a step of mounting a pulser receiver, a step of causing the ultrasonic probe to transmit ultrasonic waves, a step of causing the ultrasonic probe to receive a reflected wave of the ultrasonic waves reflected by the wind turbine blade, a step of causing the pulser receiver to acquire reflected-wave data, a step of causing the pulser receiver to wirelessly transmit the reflected-wave data, a step of causing at least one of antennas to receive the wirelessly transmitted reflected-wave data, and a step of causing an information processing device electrically connected to the at least two antennas to perform information processing on the reflected-wave data.

9 Claims, 8 Drawing Sheets

(52) U.S. Cl.
CPC ..... *F05B 2270/303* (2013.01); *F05B 2270/80* (2013.01); *G01N 2291/044* (2013.01); *G01N 2291/2693* (2013.01)

(58) Field of Classification Search
CPC ...... G01N 2291/2693; G01N 2291/044; F05B 2270/303; F05B 2270/80; F05B 2260/80; Y02E 10/72
USPC .......................................................... 73/620
See application file for complete search history.

(56) References Cited

U.S. PATENT DOCUMENTS

| | | | | |
|---|---|---|---|---|
| 9,194,843 | B2 * | 11/2015 | Newman | G01N 29/22 |
| 9,562,870 | B2 * | 2/2017 | Bouteyre | F03D 1/065 |
| 10,309,375 | B2 * | 6/2019 | Röer | F03D 80/82 |
| 2020/0025176 | A1 | 1/2020 | Georgeson et al. | |
| 2020/0400127 | A1 | 12/2020 | Lowenhar et al. | |

FOREIGN PATENT DOCUMENTS

| | | |
|---|---|---|
| EP | 1 930 722 B1 | 11/2015 |
| WO | 2021/018671 A1 | 2/2021 |

\* cited by examiner

INSPECTION METHOD FOR WIND TURBINE BLADE OF WIND POWER GENERATING APPARATUS

RELATED APPLICATIONS

The present application is based on, and claims priority from, Japanese Application No. JP 2021-076067 filed Apr. 28, 2021, the disclosure of which is hereby incorporated by reference herein in its entirety.

TECHNICAL FIELD

The present disclosure relates to an inspection method for a wind turbine blade of a wind power generating apparatus.

BACKGROUND

Patent Document 1 describes a method for wirelessly transmitting, to a control unit, a signal which is received by an ultrasonic probe mounted on a blade root of a wind turbine blade, causing the control unit to receive the wirelessly transmitted signal, and inspecting a defect caused in the blade root based on the received signal.

CITATION LIST

Patent Literature

Patent Document 1: WO 2021/018671A

SUMMARY

However, wirelessly transmitting a signal of data regarding the defect of the wind turbine blade from the ultrasonic probe mounted on the wind turbine blade, when the wind turbine blade rotates, the control unit may be unable to appropriately receive the signal depending on a positional relationship between a transmitting body wirelessly transmitting the signal and a receiving body, such as an antenna, receiving the wirelessly transmitted signal.

In view of the above, an object of at least one embodiment of the present disclosure is to provide an inspection method for a wind turbine blade of a wind power generating apparatus, capable of appropriately transmitting/receiving data regarding a defect of the wind turbine blade in the wind power generating apparatus.

In order to achieve the above object, an inspection method according the present disclosure is an inspection method for a wind turbine blade of a wind power generating apparatus, the wind power generating apparatus including a nacelle for rotatably supporting a rotor head including the wind turbine blade, the method including a step of mounting a plurality of ultrasonic probes at different positions in the wind turbine blade, a step of mounting a pulser receiver, which is provided for each of a plurality of groups obtained by dividing the plurality of ultrasonic probes such that each of the plurality of groups includes at least one ultrasonic probe, to be electrically connected to the at least one ultrasonic probe belonging to each of the plurality of groups, a step of causing the pulser receiver to transmit ultrasonic waves from the at least one ultrasonic probe to the wind turbine blade, a step of causing the at least one ultrasonic probe to receive a reflected wave of the ultrasonic waves reflected by the wind turbine blade, a step of causing the pulser receiver electrically connected to the at least one ultrasonic probe to acquire data on the reflected wave received by the at least one ultrasonic probe, a step of causing the pulser receiver to wirelessly transmit the data on the reflected wave, a step of causing at least one of at least two antennas disposed outside the nacelle to receive the wirelessly transmitted data on the reflected wave, and a step of causing an information processing device electrically connected to the at least two antennas to perform information processing on the data on the reflected wave.

According to an inspection method of the present disclosure, since any one of antennas can receive reflected-wave data wirelessly transmitted from a pulser receiver, it is possible to appropriately transmit/receive data regarding a defect of a wind turbine blade in a wind power generating apparatus.

DETAILED DESCRIPTION

An inspection method for a wind turbine blade of a wind power generating apparatus according to an embodiment of the present disclosure will be described below with reference to the drawings. The embodiment to be described below indicates one aspect of the present disclosure, does not intend to limit the disclosure, and can optionally be modified within a range of a technical idea of the present disclosure.

<Configuration of Wind Power Generating Apparatus to which inspection Method According to Embodiment of Present Disclosure is Applied>

Figure 1:
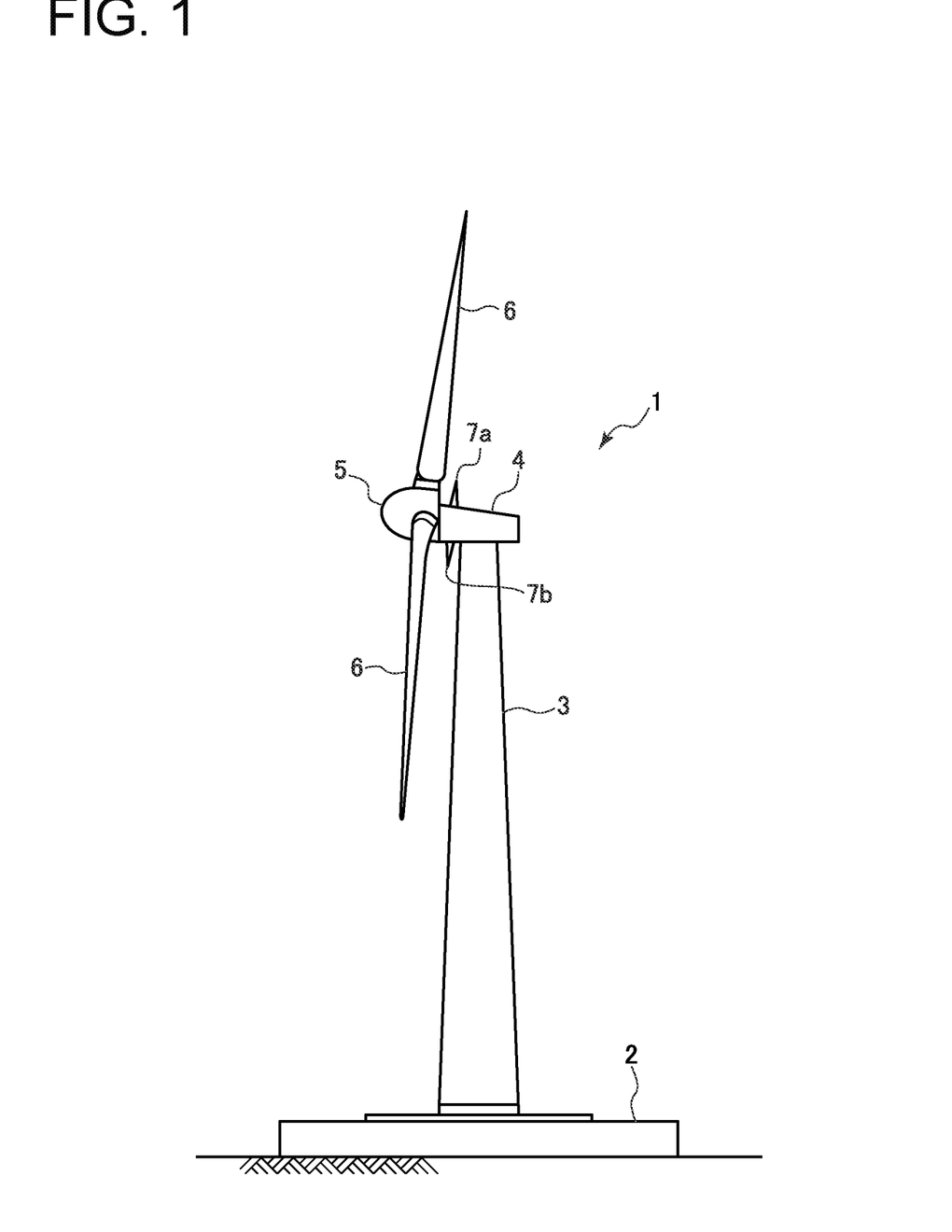
FIG. 1 is a configuration view of a wind power generating apparatus to which an inspection method according to an embodiment of the present disclosure is applied.

As shown in FIG. 1, a wind power generating apparatus 1 includes a tower 3 disposed on a foundation 2, a nacelle 4 disposed at an upper end of the tower 3, and a rotor head 5 rotatably supported on a front-end side of the nacelle 4. The rotor head 5 is mounted with a plurality of wind turbine blades 6 radially disposed around a rotational axis thereof. The number of wind turbine blades 6 mounted on the rotor head 5 is optional.

Outside the nacelle 4, for example, on an outer surface of the nacelle 4, two antennas 7a, 7b are disposed. Positions where the antennas 7a, 7b are, respectively, disposed on the outer surface of the nacelle 4 are not particularly limited. However, it is preferable that the antennas 7a, 7b are disposed at different positions along a rotational direction of the wind turbine blade 6. As one of specific examples of the above form, FIG. 1 illustrates a form in which the antenna 7a is disposed at a vertically highest position on the outer surface of the nacelle 4, that is, to extend vertically upward from the outer surface of the nacelle 4, and the antenna 7b is disposed at a vertically lowest position on the outer surface of the nacelle 4, that is, to extend vertically downward from the outer surface of the nacelle 4.

A description will be given below with the form in which the two antennas 7a, 7b are disposed. However, not less than three antennas may be disposed. In this form as well, it is preferable that the respective antennas are disposed at different positions along the rotational direction of the wind turbine blade 6. Moreover, the positions where not less than two antennas are, respectively, disposed are not limited to the outer surface of the nacelle 4, but may be disposed on an outer surface of the tower 3 or the foundation 2, may be disposed on an outer surface of any of a nacelle, a tower, a foundation of a wind power generating apparatus different from the wind power generating apparatus 1, or may be disposed on a roof or the like of a building disposed on the ground. As will be described later, the antennas 7a, 7b are wire-connected to an information processing device 10 (see FIG. 2) disposed in the nacelle 4, and may be disposed anywhere as long as the antennas 7a, 7b can be wire-connected to the information processing device 10.

Figure 2:
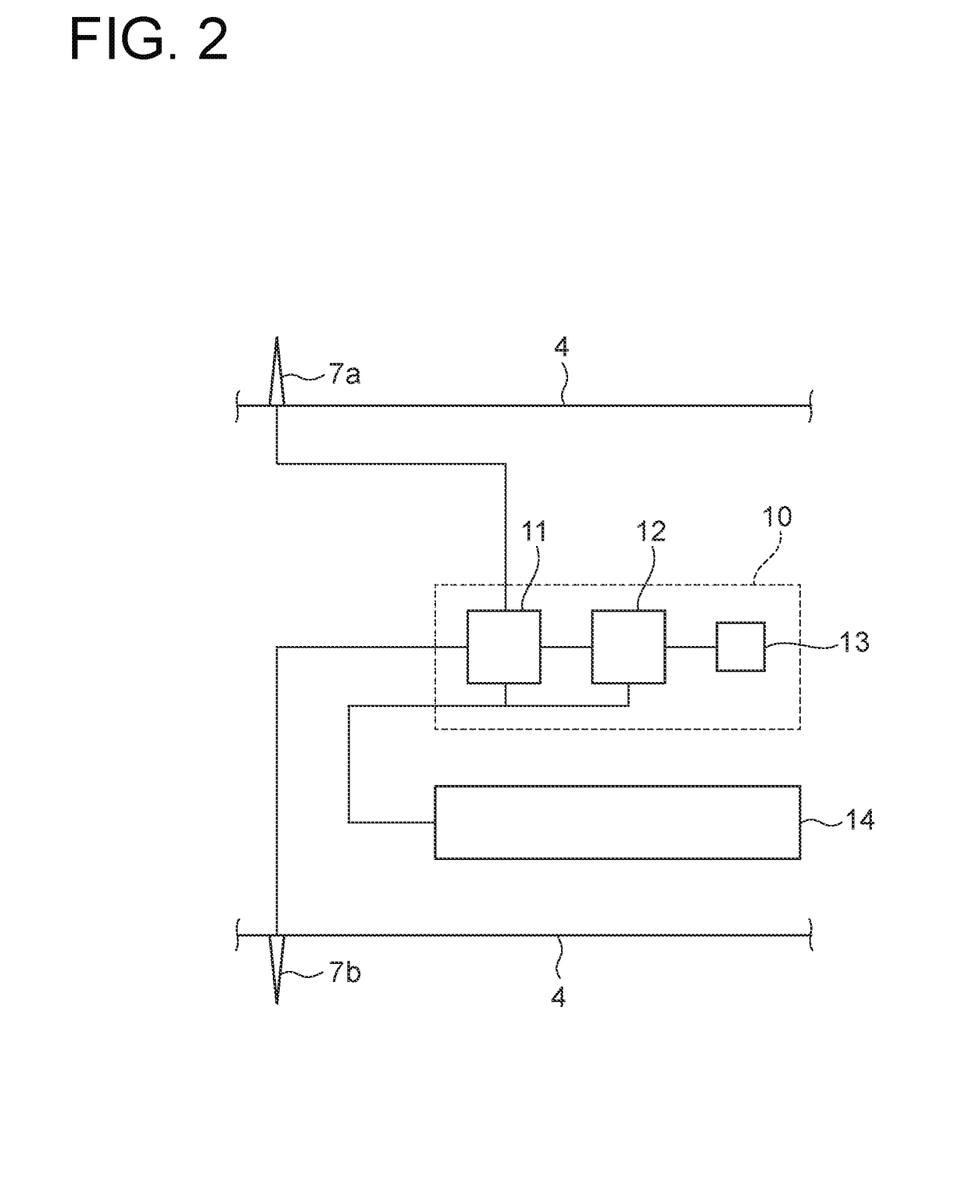
FIG. 2 is a schematic configuration diagram of an information processing device used in the inspection method according to an embodiment of the present disclosure.

As shown in FIG. 2, the information processing device 10 for performing information processing on a signal (reflected-wave data) received by the antennas 7a, 7b by an operation to be described later is disposed in the nacelle 4. The information processing device 10 includes a wireless master machine 11 wire-connected to each of the antennas 7a, 7b, a computer 12 wire-connected to the wireless master machine 11, and a Wi-Fi router 13 for connecting the computer 12 to the Internet. The wireless master machine 11 and the computer 12 are each configured to be powered from a control board 14 disposed in the nacelle 4.

Figure 3:
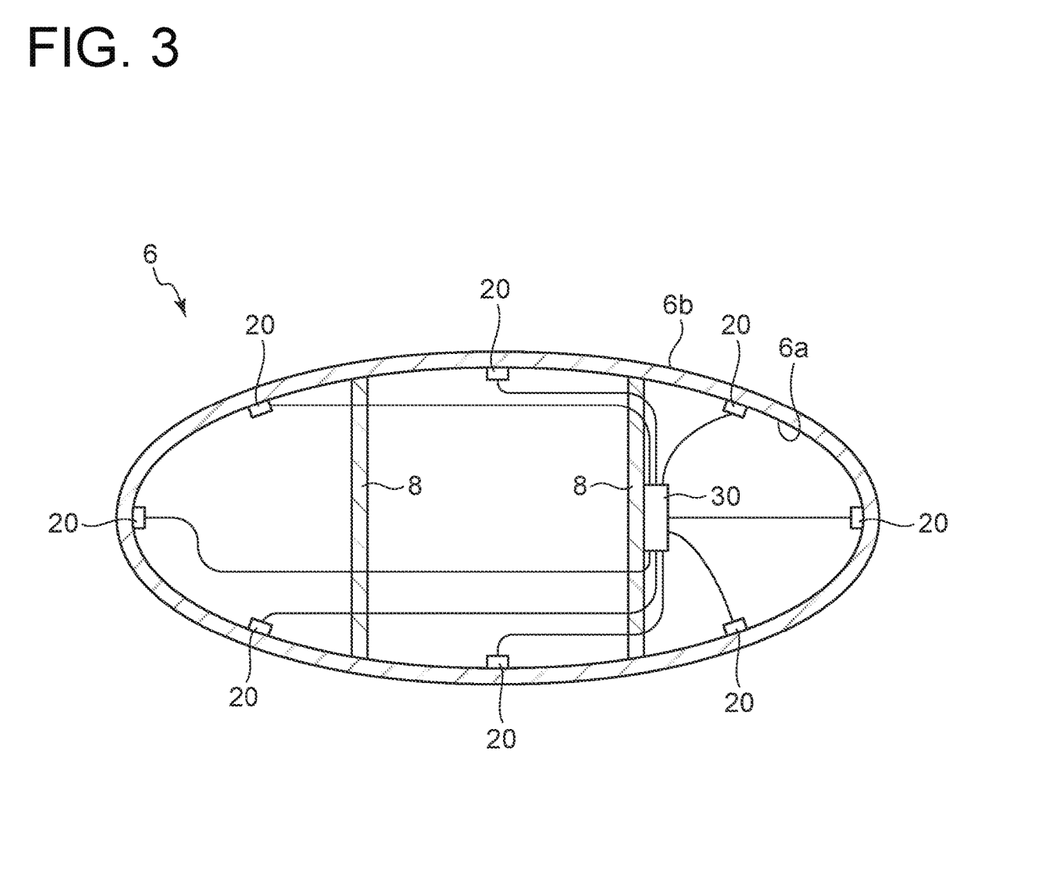
FIG. 3 is a view showing an internal configuration of a wind turbine blade in the wind power generating apparatus to which the inspection method according to an embodiment of the present disclosure is applied.

As shown in FIG. 3, an ultrasonic probe 20 is disposed on an inner circumferential surface 6a defining an interior space of each wind turbine blade 6. The ultrasonic probe 20 is configured to transmit ultrasonic waves toward the inner circumferential surface 6a of the wind turbine blade 6, and to receive a reflected wave of the ultrasonic waves reflected by the inner circumferential surface 6a of the wind turbine blade 6 and a reflected wave of the ultrasonic waves passing through the inner circumferential surface 6a of the wind turbine blade 6 and reflected by an outer circumferential surface 6b of the wind turbine blade 6 (the latter reflected wave is referred to as a back echo). The number of ultrasonic probes 20 disposed in the interior space of each wind turbine blade 6 is optional, and one or not less than two wind turbine blades 6 may be disposed.

A shareweb 8 is disposed in the interior space of each wind turbine blade 6, and the shareweb 8 is fixed to one pulser receiver 30 wire-connected to all the ultrasonic probes 20 disposed in the interior space of the wind turbine blade 6. The pulser receiver 30 is configured to transmit the ultrasonic waves from each ultrasonic probe 20 at a preset interval, and to wirelessly transmit data on the reflected wave received by each ultrasonic probe 20 as an electric signal. The wirelessly transmitted electric signal is received by the aforementioned antenna 7a, 7b (see FIG. 2).

A description will be given below with a configuration in which one pulser receiver 30 is provided for each wind turbine blade 6. However, the present disclosure is not limited to this configuration. If a plurality of ultrasonic probes 20 are disposed in the interior space of each wind turbine blade 6, it may be configured such that the plurality of ultrasonic probes 20 are grouped into not less than two groups such that each group includes at least one ultrasonic probe, and one pulser receiver 30 is provided for each group, that is, all the ultrasonic probes 20 in each group is wire-connected to the one same pulser receiver 30. In the configuration of FIG. 3 described above, all the ultrasonic probes 20 provided for each wind turbine blade 6 constitute one group.

Figure 4:
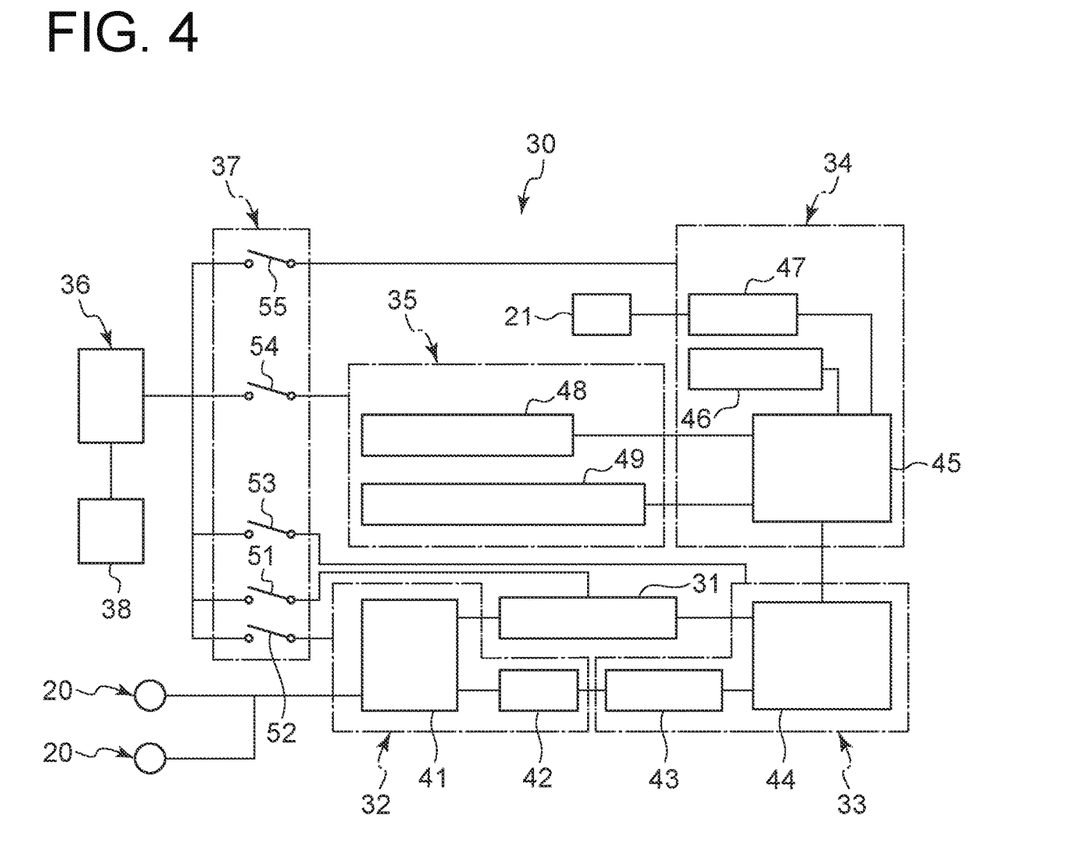
FIG. 4 is a schematic configuration diagram of a pulser receiver used in the inspection method according to an embodiment of the present disclosure.

As shown in FIG. 4, the pulser receiver 30 includes an ultrasonic pulse generating circuit 31, an ultrasonic pulse receiving circuit (analog circuit) 32, a digital circuit 33, a control circuit 34, a communication circuit 35, a power circuit 36, and a switching circuit 37.

The ultrasonic pulse receiving circuit 32 includes a multiplexor 41 and an amplifier 42. The multiplexor 41 and the amplifier 42 are electrically connected to each other. The multiplexor 41 is electrically connected to the ultrasonic pulse generating circuit 31 and all the ultrasonic probes 20 which belong to the group corresponding to the pulser receiver 30.

The digital circuit 33 includes an A/D converter 43 and a digital processing IC (FPGA) 44. The A/D converter 43 and the FPGA 44 are electrically connected to each other. The A/D converter 43 is electrically connected to the amplifier 42, and the FPGA 44 is electrically connected to the ultrasonic pulse generating circuit 31.

The control circuit 34 includes a processing device (CPU) 45 and a memory 46. The CPU 45 is electrically connected to the FPGA 44 and the memory 46. Although not an essential constituent element in performing the inspection method of the present disclosure, each wind turbine blade 6 (see FIG. 3) can be provided with a temperature sensor 21 for measuring a temperature in the interior space of the wind turbine blade 6. In the configuration with the temperature sensor 21, the control circuit 34 further includes a temperature sensor IC 47 electrically connected to the CPU 45, and the temperature sensor 21 is electrically connected to the temperature sensor IC 47. A pulser receiver with a built-in temperature sensor is also commercially available, and using such pulser receiver, it is possible to avoid the trouble of having to dispose, separately from the pulser receiver 30, the temperature sensor 21 in the interior space of the wind turbine blade 6.

The communication circuit 35 includes a wireless communication module 48 and a wire communication module (USB terminal) 49. The wireless communication module 48 and the USB terminal 49 are electrically connected to the CPU 45.

The power circuit 36 is electrically connected to a battery 38, and is electrically connected to the ultrasonic pulse generating circuit 31, the ultrasonic pulse receiving circuit 32, the digital circuit 33, the control circuit 34, and the communication circuit 35 via the switching circuit 37. The power circuit 36 is configured to supply power from the battery 38 to the ultrasonic pulse generating circuit 31, the ultrasonic pulse receiving circuit 32, the digital circuit 33, the control circuit 34, and the communication circuit 35. The switching circuit 37 includes switches 51, 52, 53, 54, and 55 capable of shutting off power supply to the ultrasonic pulse generating circuit 31, the ultrasonic pulse receiving circuit 32, the digital circuit 33, the control circuit 34, and the communication circuit 35, respectively, in accordance with processing contents of the control circuit 34.

<Inspection Method According to Embodiment of Present Disclosure>

Figure 5:
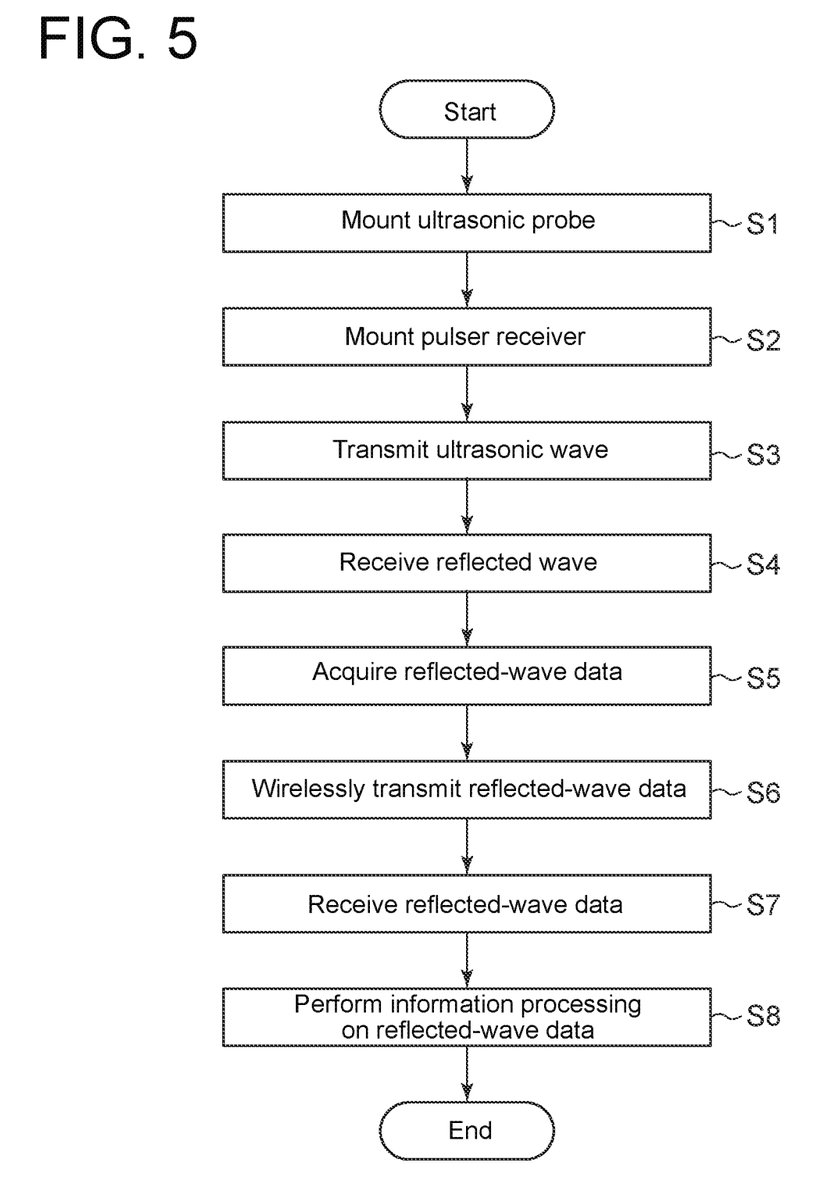
FIG. 5 is a flowchart of the inspection method according to an embodiment of the present disclosure.

As shown in FIG. 1, the inspection method according to an embodiment of present disclosure can be performed regardless of whether or not the wind turbine blade 6 rotates. First, describing the overview of the inspection method, as shown in FIG. 5, the inspection method includes a step S1 of mounting the ultrasonic probe 20, a step S2 of mounting the pulser receiver 30, a step S3 of causing the ultrasonic probe 20 to transmit ultrasonic waves, a step S4 of causing the ultrasonic probe 20 to receive a reflected wave of the ultrasonic waves reflected by the wind turbine blade 6, a step S5 of causing the pulser receiver 30 to acquire reflected-wave data, a step S6 of causing the pulser receiver 30 to wirelessly transmit the reflected-wave data, a step S7 of causing at least one of the antennas 7a, 7b to receive the wirelessly transmitted reflected-wave data, and a step S8 of causing the information processing device 10 electrically connected to the antennas 7a, 7b to perform information processing on the reflected-wave data.

As described above with reference to FIG. 3, steps S1 and S2 include mounting, in the interior space of the wind turbine blade 6, at least one ultrasonic probe 20 constituting one group and one pulser receiver 30 wire-connected to all the ultrasonic probes 20 constituting one group. Once the ultrasonic probe 20 and the pulser receiver 30 are mounted, it is possible to omit steps S1 and S2, and to repeat the inspection method from step S3, except for when maintenance or replacement of the ultrasonic probe 20 and the pulser receiver 30 is performed, or a mounting position of the ultrasonic probe 20 is changed. Therefore, in the inspection method, a time interval may exist between steps S1 and 2, and step S3.

Step S3 includes causing the pulser receiver 30 to transmit ultrasonic waves from each ultrasonic probe 20 toward the inner circumferential surface 6a of the wind turbine blade 6 at predetermined intervals. If the plurality of ultrasonic probes 20 belong to one group, the pulser receiver 30 transmits the ultrasonic waves from the plurality of ultrasonic probes 20 in turns at the predetermined intervals. The predetermined intervals can be set optionally, such as per minute, every ten minutes, per hour, every six hours, every twelve hours, or per day.

Once a timing has arrived at which the pulser receiver 30 transmits the ultrasonic waves from any one of the ultrasonic probes 20, as shown in FIG. 4, the ultrasonic pulse generating circuit 31 outputs a pulsed voltage to the multiplexor 41. The multiplexor 41 sets channel 1 and outputs the pulsed voltage output from the ultrasonic pulse generating circuit 31 to a transmitter of the ultrasonic probe 20 corresponding to channel 1. Consequently, the ultrasonic waves are transmitted from the transmitter of the ultrasonic probe 20 corresponding to channel 1. A timing at which the ultrasonic waves are transmitted is controlled by the control circuit 34.

Figure 6:
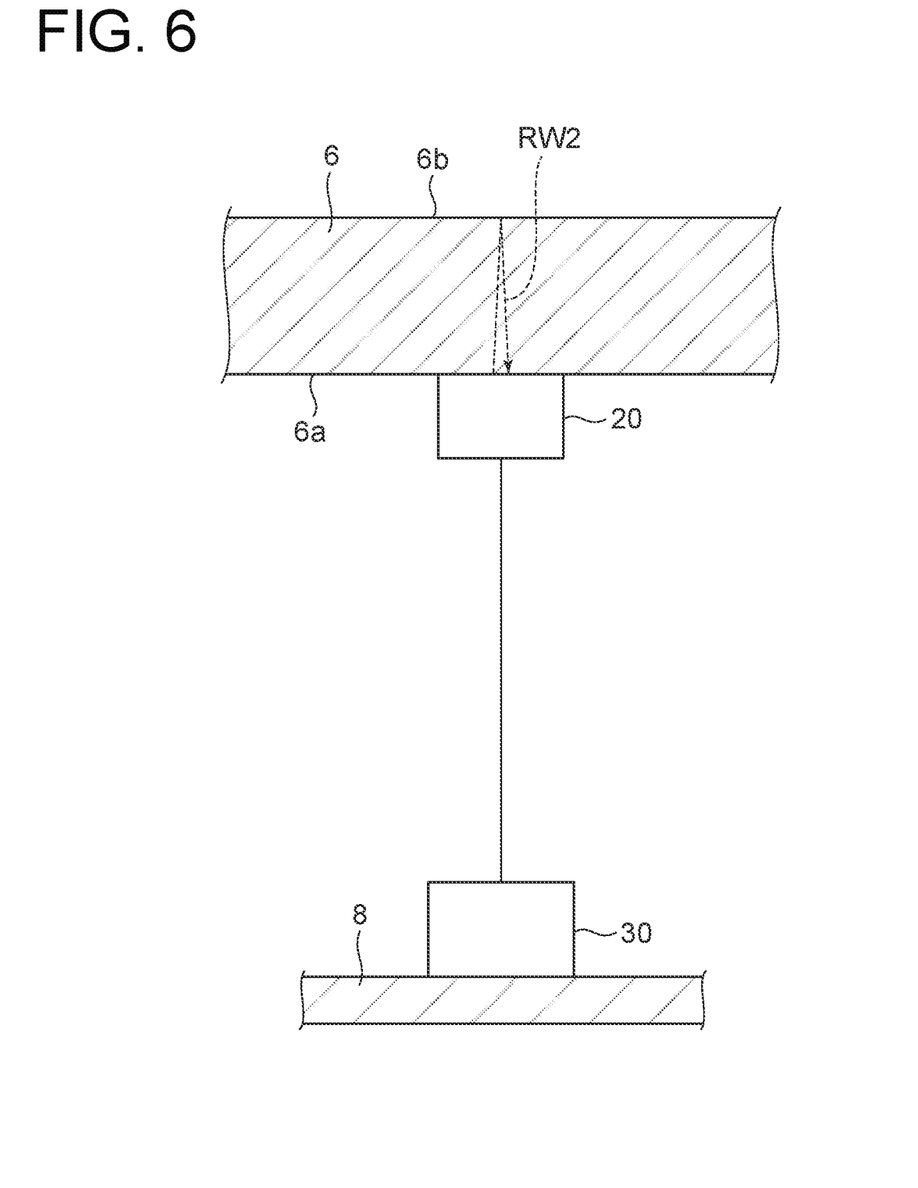
FIG. 6 is a cross-sectional view for describing an operation in which an ultrasonic probe transmits ultrasonic waves and receives reflected waves of the ultrasonic waves, in the inspection method according to an embodiment of the present disclosure.

As shown in FIG. 6, some of the ultrasonic waves transmitted toward the inner circumferential surface 6a of the wind turbine blade 6 from the transmitter of the ultrasonic probe 20 corresponding to channel 1 are reflected by the inner circumferential surface 6a and become a first reflected wave, and some of the ultrasonic waves pass through the inner circumferential surface 6a, are reflected by the outer circumferential surface 6b of the wind turbine blade 6, and become a second reflected wave. FIG. 6 illustrates a second reflected wave RW2 (back echo). Step S4 includes causing a receiver of the ultrasonic probe 20 corresponding to channel 1 to receive such reflected wave.

As shown in FIG. 4, step S5 includes causing the multiplexor 41 to convert the reflected wave received by the receiver of the ultrasonic probe 20 as the electric signal and to receive the converted electric signal. The electric signal from the multiplexor 41 is amplified by the amplifier 42. The A/D converter 43 converts the analog signal from the amplifier 42 into a digital signal. The FPGA 44 generates transmission measurement data from the digital signal and outputs the transmission measurement data to the control circuit 34 as a waveform with respect to time. The CPU 45 saves the transmission measurement data from the FPGA 44 in the memory 46 and if the temperature sensor 21 and the temperature sensor IC 47 are provided, also saves data on a detected value by the temperature sensor 21 in the memory 46.

Step S6 includes causing the communication circuit 35 to wirelessly transmit, to the outside, the transmission measurement data from the FPGA 44 and the data on the detected value by the temperature sensor 21 or the data saved in the memory 46.

If the plurality of ultrasonic probes 20 belong to one group, after steps S3 to S6 are performed, the multiplexor 41 switches from channel 1 to channel 2 and causes the ultrasonic probe 20 corresponding to channel 2 to transmit ultrasonic waves and to receive a reflected wave, that is, steps S3 and S4 are performed, and subsequently steps S5 and S6 are performed. If not less than three ultrasonic probes 20 belong to one group, the multiplexor 41 further switches channels in sequence such as channel 3, channel 4, repeating steps S3 to S6.

Step S7 includes causing at least one of the antennas 7a 7b to receive the signal wirelessly transmitted from the communication circuit 35, as shown in FIG. 2. The signal received by at least one of the antennas 7a 7b is transmitted to the wireless master machine 11 and acquired by the computer 12.

For example, if only the antenna 7a is disposed, the antenna 7a may be unable to receive the signal wirelessly transmitted from the pulser receiver 30, depending on a rotational position of the wind turbine blade 6. However, in the inspection method according to the present embodiment, since the two antennas 7a, 7b are disposed at the different positions along the rotational direction of the wind turbine blade 6, one of the antennas 7a, 7b can receive the signal wirelessly transmitted from the pulser receiver 30, regardless of the rotational position of the wind turbine blade 6. Thus, it is possible to appropriately receive the signal wirelessly transmitted from the pulser receiver 30.

Step S8 includes causing the computer 12 to perform information processing on the acquired signal. Regarding the signal wirelessly transmitted from the pulser receiver 30, depending on the rotational position of the wind turbine blade 6, a reception intensity of the signal received by the antenna 7a, 7b may be different. Thus, after acquiring the signals received by the antennas 7a, 7b, respectively, via the wireless master machine 11, the computer 12 may compare the reception intensities of the respective signals and use the signal having the larger reception intensity for information processing. The signal having the larger reception intensity can be the signal received by one of the antennas 7a, 7b or may be a signal obtained by alternately adopting the signals received by the antennas 7a, 7b, respectively, at appropriate time intervals. Thus, the information processing device 10 can perform information processing on the appropriately transmitted/received signal, making it possible to improve inspection accuracy for the wind turbine blade 6.

Figure 7:
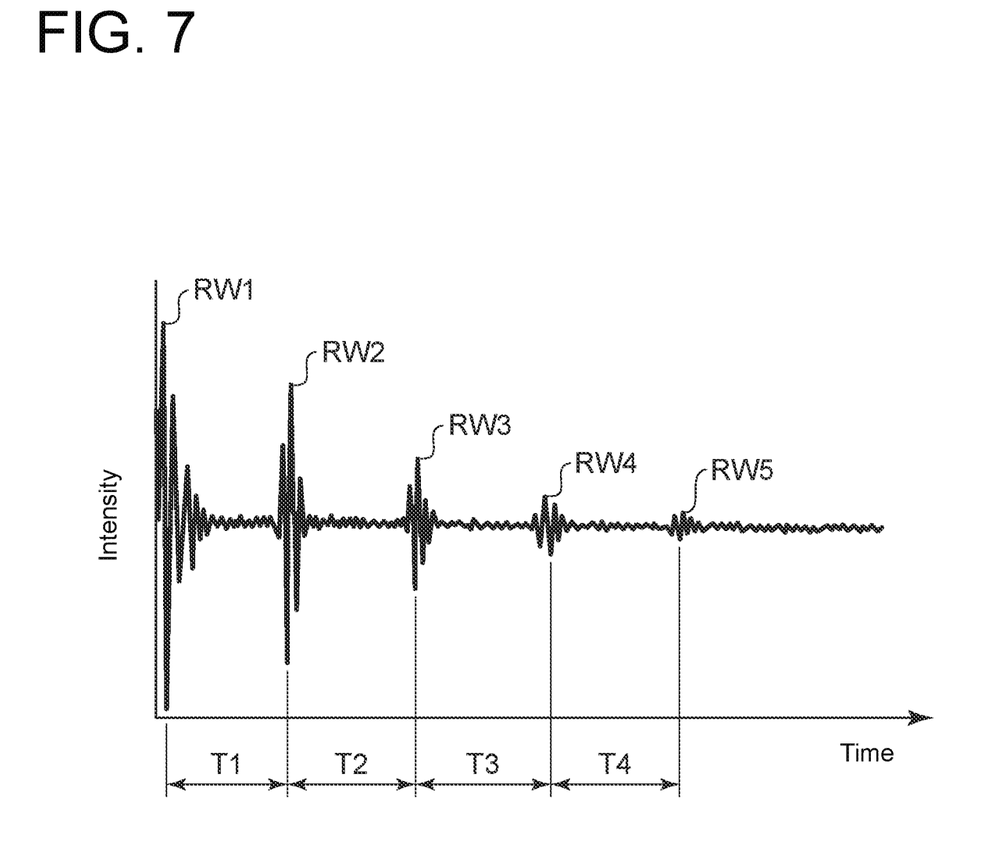
FIG. 7 is a chart schematically showing an example of a waveform of the reflected waves received by the ultrasonic probe, in the inspection method according to an embodiment of the present disclosure.

As shown in FIG. 6, the reflected wave generated by reflection of the ultrasonic waves transmitted from the ultrasonic probe 20 by the wind turbine blade 6 includes the first reflected wave and the second reflected wave, as described above. In reality, however, besides these reflected waves, countless reflected waves can exist, such as a third reflected wave generated by reflection of the second reflected wave by the inner circumferential surface 6a and further reflection of the second reflected wave by the outer circumferential surface 6b, and a fourth reflected wave generated by further similar reflection of the third reflected wave. FIG. 7 is a chart schematically showing an example of a waveform of reflected waves received by the ultrasonic probe 20. FIG. 7 illustrates a first reflected wave RW1 to a fifth reflected wave RW5, and each of time intervals T1 to T4 between the adjacent reflected waves is the same time according to a distance from the inner circumferential surface 6a to the outer circumferential surface 6b, in principle.

Based on such principle, the computer 12 (see FIG. 2) extracts data on the back echo, that is, the second reflected wave RW2 from the acquired signal and makes a graph of a temporal change in intensity of the back echo. Making such graph of the temporal change in back echo for each ultrasonic probe 20 (see FIG. 6), that is, for each channel of the pulser receiver 30 (see FIG. 6), it is possible to obtain the temporal change in intensity for each position of the back echo.

Using the thus obtained temporal change in intensity for each position of the back echo, determination of whether the wind turbine blade 6 (see FIG. 6) has a defect or the like may be performed. However, since the intensity of the back echo varies depending on a temperature, it is preferable to correct the intensity of the back echo based on the temperature in the interior space of the wind turbine blade 6. With such correction, it is possible to correct the variation in intensity of the back echo caused by a difference in temperature at the time of measurement, making it possible to improve inspection accuracy for the wind turbine blade 6.

Figure 8:
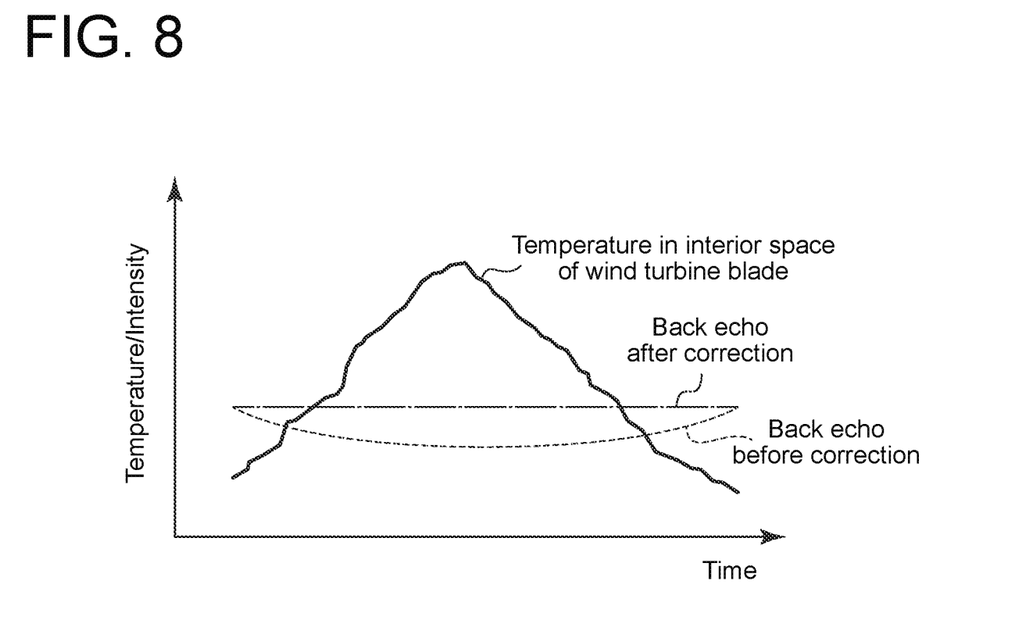
FIG. 8 is a graph for describing correction of an intensity of a back echo based on a temperature, in the inspection method according to an embodiment of the present disclosure.

The correction of the intensity of the back echo by the temperature can illustratively be performed as follows. The computer 12 corrects the temporal change in intensity of the back echo based on the temperature in the interior space of the wind turbine blade 6 detected by the temperature sensor 21 (see FIG. 4). That is, if the temperature in the interior space of the wind turbine blade 6 varies as illustratively indicated by a solid line in FIG. 8, the intensity of the back echo varies in accordance with the temperature in the interior space of the wind turbine blade 6 as illustratively indicated by a dotted line in FIG. 8 even if the intensity of the back echo actually does not vary. Thus, the computer 12 corrects the intensity of the back echo based on a preset correction value. Then, as illustratively indicated by a single-dotted chain line in FIG. 8, an influence by the variation in temperature in the interior space of the wind turbine blade 6 is removed from the temporal change in intensity of the back echo. The correction value for the correction by the temperature is preferably calculated in advance from a deviation between the intensity of the back echo before correction and the intensity of the back echo after correction based on the temperature in the interior space of the wind turbine blade 6, by an experiment, a simulation, or the like.

Based on the result obtained by thus performing information processing, it is possible to inspect the wind turbine blade 6 by using the computer 12 in the nacelle 4 (see FIG. 1). Meanwhile, the result obtained by thus performing information processing is wirelessly transmitted via the Wi-Fi router 13 (see FIG. 2) to be stored in a predesignated folder (storage part) on the cloud, allowing a person who inspects the wind turbine blade 6 to access the result stored on the cloud from a computer in an office where the person works or a home computer, a portable tablet, or the like. Thus, it is possible to inspect the wind turbine blade 6 at anytime and anywhere, without going off to the site where the wind power generating apparatus 1 is disposed.

It is possible to inspect the wind turbine blade 6 based on the temporal change in intensity for each position of the back echo. For example, if the back echo of one channel greatly decreases or disappears, it is monitored whether the phenomenon continues over the following days. If it is confirmed that the phenomenon continues, the person goes off to the site to conduct a field investigation, and in case separation or damage is found, repair work is performed at an appropriate timing.

As in the present embodiment, if the positions of the plurality of antennas are different along the rotational direction of the wind turbine blade 6, it is possible to appropriately transmit/receive the signal even if the wind turbine blade 6 rotates. However, it is also possible to dispose the plurality of antennas at substantially identical positions to be adjacent to each other. In this case, it is difficult to obtain the technical effects that can be obtained from the above-described embodiments. However, even if one of the antennas fails, the other antennas still can receive the signal, making it possible to achieve the technical effect of being able to appropriately transmit/receive the signal.

The contents described in the above embodiments would be understood as follows, for instance.

[1] An inspection method according to one aspect is an inspection method for a wind turbine blade (6) of a wind power generating apparatus (1), the wind power generating apparatus (1) including a nacelle (4) for rotatably supporting a rotor head (5) including the wind turbine blade (6), the method including a step of mounting a plurality of ultrasonic probes (20) at different positions in the wind turbine blade (6), a step of mounting a pulser receiver (30), which is provided for each of a plurality of groups obtained by dividing the plurality of ultrasonic probes (20) such that each of the plurality of groups includes at least one ultrasonic probe (20), to be electrically connected to the at least one ultrasonic probe (20) belonging to each of the plurality of groups, a step of causing the pulser receiver (30) to transmit ultrasonic waves from the at least one ultrasonic probe (20) to the wind turbine blade (6), a step of causing the at least one ultrasonic probe (20) to receive a reflected wave of the ultrasonic waves reflected by the wind turbine blade (6), a step of causing the pulser receiver (30) electrically connected to the at least one ultrasonic probe (20) to acquire data on the reflected wave received by the at least one ultrasonic probe (20), a step of causing the pulser receiver (30) to wirelessly transmit the data on the reflected wave, a step of causing at least one of at least two antennas (7a, 7b) disposed outside the nacelle (4) to receive the wirelessly transmitted data on the reflected wave, and a step of causing an information processing device (10) electrically connected to the at least two antennas (7a, 7b) to perform information processing on the data on the reflected wave.

With the inspection method of the present disclosure, since any one of the antennas can receive the reflected-wave data wirelessly transmitted from the pulser receiver, it is possible to appropriately transmit/receive data regarding a defect of the wind turbine blade in the wind power generating apparatus.

[2] An inspection method according to another aspect is the inspection method of [1], wherein the at least two antennas (7a, 7b) are disposed at different positions along a rotational direction of the wind turbine blade (6).

With the above inspection method, since any one of the antennas can receive the reflected-wave data wirelessly transmitted from the pulser receiver regardless of a position where the pulser receiver is located by the rotation of the wind turbine blade, it is possible to appropriately transmit/receive the data regarding the defect of the wind turbine blade even if the wind turbine blade rotates in the wind power generating apparatus.

[3] An inspection method according to still another aspect is the inspection method of [1] or [2], wherein the information processing device (10) performs information processing on data on the reflected wave which is received by an antenna of the at least two antennas (7a, 7b) having a largest reception intensity of the data on the reflected wave.

With the above inspection method, since the information processing device can perform information processing on the appropriately transmitted/received reflected-wave data, it is possible to improve inspection accuracy for the wind turbine blade.

[4] An inspection method according to yet another aspect is the inspection method of any one of [1] to [3], wherein the information processing device (10) is disposed in the nacelle (4).

With the above configuration, disposing the antenna on an outer wall of the nacelle, it is possible to shorten a wiring distance between the antenna and the information processing device.

[5] An inspection method according to yet another aspect is the inspection method of any one of [1] to [4], wherein, in a group of the plurality of groups including the plurality of ultrasonic probes (20), the pulser receiver (30) causes the plurality of ultrasonic probes (20) to transmit the ultrasonic waves to the wind turbine blade (6) in turns and acquires the data on the reflected wave of the ultrasonic waves reflected by the wind turbine blade (6) from the plurality of ultrasonic probes (20) in turns.

With the above configuration, since one pulser receiver can acquire the reflected-wave data from each ultrasonic probe even in the case of the group including the plurality of ultrasonic probes, it is possible to decrease the number of pulser receivers to be installed and to reduce an inspection cost.

[6] An inspection method according to yet another aspect is the inspection method of any one of [1] to [5], wherein the information processing device (10) detects a position and an intensity of a back echo from the data on the reflected wave.

With the above configuration, based on the position and the intensity of the back echo detected from the reflected-wave data, it is possible to detect a possibility of occurrence of the defect in wind turbine blade.

[7] An inspection method according to yet another aspect is the inspection method of [6], wherein the step of causing the information processing device (10) to perform information processing on the data on the reflected wave includes a step of measuring a temperature in the wind turbine blade (6), and a step of correcting the intensity of the back echo based on the temperature.

Although the intensity of the back echo varies depending on the temperature, with the above configuration, since it is possible to correct the variation in intensity of the back echo caused by a difference in temperature at the time of measurement, it is possible to improve inspection accuracy for the wind turbine blade.

[8] An inspection method according to yet another aspect is the inspection method of any one of [1] to [7], further including a step of wirelessly transmitting a result of performing information processing on the data on the reflected wave to be stored in a predesignated storage part, and a step of accessing the storage part to acquire the result.

With the above configuration, since the result of performing information processing on the reflected-wave data can be acquired in a location away from the wind power generating apparatus, it is possible to inspect the wind turbine blade at anytime and anywhere.

[9] An inspection method according to yet another aspect is the inspection method of any one of [1] to [8], wherein the wind turbine blade (6) internally includes a shareweb (8), and the pulser receiver (30) is fixed to the shareweb (8).

With the above configuration, since the pulser receiver can be installed in the existing component, it is possible to reduce the inspection cost.

The invention claimed is:

1. An inspection method for a wind turbine blade of a wind power generating apparatus,
the wind power generating apparatus including a nacelle for rotatably supporting a rotor head including the wind turbine blade,
the method comprising:
a step of mounting a plurality of ultrasonic probes at different positions in the wind turbine blade;
a step of mounting a pulser receiver, which is provided for each of a plurality of groups obtained by dividing the plurality of ultrasonic probes such that each of the plurality of groups includes at least one ultrasonic probe, to be electrically connected to the at least one ultrasonic probe belonging to each of the plurality of groups;
a step of causing the pulser receiver to transmit ultrasonic waves from the at least one ultrasonic probe to the wind turbine blade;
a step of causing the at least one ultrasonic probe to receive a reflected wave of the ultrasonic waves reflected by the wind turbine blade;
a step of causing the pulser receiver electrically connected to the at least one ultrasonic probe to acquire data on the reflected wave received by the at least one ultrasonic probe;
a step of causing the pulser receiver to wirelessly transmit the data on the reflected wave;
a step of causing at least one of at least two antennas disposed outside the nacelle to receive the wirelessly transmitted data on the reflected wave; and
a step of causing an information processing device electrically connected to the at least two antennas to perform information processing on the data on the reflected wave.

2. The inspection method according to claim 1,
wherein the at least two antennas are disposed at different positions along a rotational direction of the wind turbine blade.

3. The inspection method according to claim 1,
wherein the information processing device performs information processing on data on the reflected wave which is received by an antenna of the at least two antennas having a largest reception intensity of the data on the reflected wave.

4. The inspection method according to claim 1,
wherein the information processing device is disposed in the nacelle.

5. The inspection method according to claim 1,
wherein, in a group of the plurality of groups including the plurality of ultrasonic probes, the pulser receiver causes the plurality of ultrasonic probes to transmit the ultrasonic waves to the wind turbine blade in turns and acquires the data on the reflected wave of the ultrasonic waves reflected by the wind turbine blade from the plurality of ultrasonic probes in turns.

6. The inspection method according to claim 1,
wherein the information processing device detects a position and an intensity of a back echo from the data on the reflected wave.

7. The inspection method according to claim 6,
wherein the step of causing the information processing device to perform information processing on the data on the reflected wave includes:
a step of measuring a temperature in the wind turbine blade; and
a step of correcting the intensity of the back echo based on the temperature.

8. The inspection method according to claim 1, further comprising:
a step of wirelessly transmitting a result of performing information processing on the data on the reflected wave to be stored in a predesignated storage part; and
a step of accessing the storage part to acquire the result.

9. The inspection method according to claim 1,
wherein the wind turbine blade internally includes a shareweb, and the pulser receiver is fixed to the shareweb.

* * * * *